(12) United States Patent
Sundstrom et al.

(10) Patent No.: US 11,218,943 B2
(45) Date of Patent: Jan. 4, 2022

(54) SYSTEM AND METHOD FOR SHARING CLUSTER HEAD ASSISTANCE DATA IN A DEVICE CLUSTER

(71) Applicant: Sony Corporation, Tokyo (JP)

(72) Inventors: Henrik Sundstrom, Lund (SE); Magnus Tillgren, Lund (SE); Magnus Johansson, Lund (SE); Anders Sandwang, Lund (SE); Magnus Svensson, Lund (SE)

(73) Assignee: SONY NETWORK COMMUNICATIONS EUROPE B.V., Hoofddorp (NL)

( * ) Notice: Subject to any disclaimer, the term of this patent is extended or adjusted under 35 U.S.C. 154(b) by 70 days.

(21) Appl. No.: 16/754,333

(22) PCT Filed: Oct. 8, 2018

(86) PCT No.: PCT/US2018/054795
§ 371 (c)(1),
(2) Date: Apr. 7, 2020

(87) PCT Pub. No.: WO2019/125582
PCT Pub. Date: Jun. 27, 2019

(65) Prior Publication Data
US 2020/0314726 A1 Oct. 1, 2020

(30) Foreign Application Priority Data

Dec. 20, 2017 (SE) ................................ SE1730349-6

(51) Int. Cl.
*H04W 40/20* (2009.01)
*H04W 76/11* (2018.01)
(Continued)

(52) U.S. Cl.
CPC ........... *H04W 40/20* (2013.01); *H04W 40/32* (2013.01); *H04W 40/36* (2013.01); *H04W 76/11* (2018.02); *H04W 84/18* (2013.01)

(58) Field of Classification Search
None
See application file for complete search history.

(56) References Cited

U.S. PATENT DOCUMENTS 6,980,537 B1 12/2005 Liu
2002/0090914 A1 7/2002 Kang et al.
(Continued)

FOREIGN PATENT DOCUMENTS

WO 2014108356 A2 7/2014

OTHER PUBLICATIONS

International Search Report and Written Opinion from corresponding International Application No. PCT/US2018/054795, dated Jan. 14, 2019, 16 pages.
(Continued)

*Primary Examiner* — Brian S Roberts
(74) *Attorney, Agent, or Firm* — Tucker Ellis LLP

(57) ABSTRACT

An electronic device (12) in a cluster (10) that has the potential to serve as a new cluster head (36) receives cluster head assistance data from a current cluster head (36) device. The cluster head assistance data includes at least one data item related to establishment of operative communication with the wireless communications network (28) over a network communications interface (26) of the electronic device. If the electronic device is assigned to be the new cluster head, it injects the at least one data item into a process related to operation of the network communications interface and establishment of the operative communication with the wireless communications network; establishes the operative communication with the wireless communications
(Continued)

network; and carries out cluster head functions on behalf of the cluster.

18 Claims, 2 Drawing Sheets

(51) Int. Cl.
  *H04W 40/32* (2009.01)
  *H04W 40/36* (2009.01)
  *H04W 84/18* (2009.01)

(56) References Cited

U.S. PATENT DOCUMENTS

| | | | |
|---|---|---|---|
| 2006/0126501 A1* | 6/2006 | Ramaswamy | H04L 45/22 370/221 |
| 2006/0199590 A1* | 9/2006 | Park | H04W 48/18 455/445 |
| 2009/0190522 A1* | 7/2009 | Horn | H04W 40/30 370/315 |
| 2010/0131644 A1* | 5/2010 | Jeong | H04W 40/24 709/224 |
| 2014/0036718 A1 | 2/2014 | Gao et al. | |
| 2015/0223143 A1* | 8/2015 | Celebi | H04W 24/02 455/446 |
| 2017/0223717 A1* | 8/2017 | Athani | H04W 88/04 |

OTHER PUBLICATIONS

Office Action and Search Report from corresponding Swedish Patent Application No. 1730349-6, dated Aug. 6, 2018, 8 pages.
European Office Action from corresponding European Application No. 18793536.6, dated Jul. 15, 2021, 10 pages.
C. Jennings, et al.: "REsource LOcation and Discovery (Reload) Base Protocol"; Internet Engineering Task Force (IETF); ISSN 2070-1721, dated Jan. 17, 2014, pp. 1-176.

* cited by examiner

SYSTEM AND METHOD FOR SHARING CLUSTER HEAD ASSISTANCE DATA IN A DEVICE CLUSTER

RELATED APPLICATION DATA

This application claims the benefit of Swedish Patent Application No. 1730349-6, filed Dec. 20, 2017, the disclosure of which is incorporated herein by reference in its entirety.

TECHNICAL FIELD OF THE INVENTION

The technology of the present disclosure relates generally to electronic devices and, more particularly, to systems and methods for sharing cluster head assistance data in a device cluster.

BACKGROUND

In some situations, electronic devices that have similar functional capabilities and that are in relatively close physical proximity with one another are clustered to pool resources. For example, a group of electronic devices that serve internet of things (IoT) functions may be clustered. The devices may communicate with one another over a local communications medium that operates using short-range communication technology. One of the devices may be designated as a cluster head (also referred to as a cluster lead) to carry out communications on behalf of all the devices in the cluster with a remote server over a network, such as a cellular radio network. As part of this process, the cluster head relays data from the members of the cluster to the network and vice versa. The cluster head may carry out other operations, such as receiving satellite data for location determination. Thus, the cluster head may operate a cellular radio (e.g., a long-term evolution or LTE radio) and/or a position data receiver (e.g., a global positioning system or GPS receiver) while the remaining devices power off their respective cellular radios and/or position data receivers.

Device clustering has certain advantages, such as conserving battery life of the devices in the cluster by having only one of the devices operate a cellular radio and/or a position data receiver at a time. Use of spectrum resources also may be reduced for the same reason.

Over time, the cluster head may change as devices enter and leave the cluster, or the amount of charge stored by the battery of a current cluster head device becomes depleted relative to the amount of charge stored by the batteries of other devices in the cluster. When the cluster head changes, the new cluster head powers on its cellular radio and/or position data receiver. Typical start-up operations then take place, such as undertaking network discovery operations and accessing assisted GPS (A-GPS) data. There exists a need to improve this process so that cluster head changeover takes place faster and consumes less power by the new cluster head.

SUMMARY

The disclosed approach relates to a current cluster head sharing cluster head assistance data, such as network connectivity information, with other electronic devices in the cluster. Should the cluster change to one of those other electronic devices, the new cluster head may use the shared data in a process related to the cluster head functions so as to expedite carrying out cluster head functions or conserve power by avoiding related scanning and data collection operations.

According to one aspect of the disclosure, A method of operating an electronic device to serve as a new cluster head for a cluster of electronic devices, includes receiving cluster head assistance data from a current cluster head device, the cluster head assistance data comprising at least one data item related to establishment of operative communication with a wireless communications network over a network communications interface of the electronic device; becoming assigned the new cluster head for the cluster; and establishing operative communication with the wireless communications network using the at least one data item in a process related to operation of the network communications interface.

According to another aspect of the disclosure, an electronic device is configured to take over as a new cluster head for a cluster of electronic devices from a current cluster head, the electronic device is configured to communicate with a wireless communications network; communicate with the electronic devices in the cluster; receive cluster head assistance data from the current cluster head, the cluster head assistance data comprising at least one data item related to establishment of operative communication with the wireless communications network; and upon the electronic device becoming assigned to be the new cluster head for the cluster, establish operative communication with the wireless communications network using the at least one data item in a process related to the operative communication.

According to another aspect of the disclosure, a method of operating an electronic device to serve as a cluster head for a cluster of electronic devices includes acquiring cluster head assistance data, the cluster head assistance data comprising at least one data item related to establishment of operative communication between a wireless communications network and the electronic device; and sharing the acquired cluster head assistance data with the other electronic devices in the cluster.

According to still another aspect of the disclosure, an electronic device is configured to serve as a cluster head for a cluster of electronic devices, the electronic device is configured to: communicate with a wireless communications network; communicate with the electronic devices in the cluster; acquire cluster head assistance data, the cluster head assistance data comprising at least one data item related to establishment of operative communication between the wireless communications network and the electronic device; and share the acquired cluster head assistance data with the other electronic devices in the cluster.

DETAILED DESCRIPTION OF EMBODIMENTS

Introduction

Figure 1:
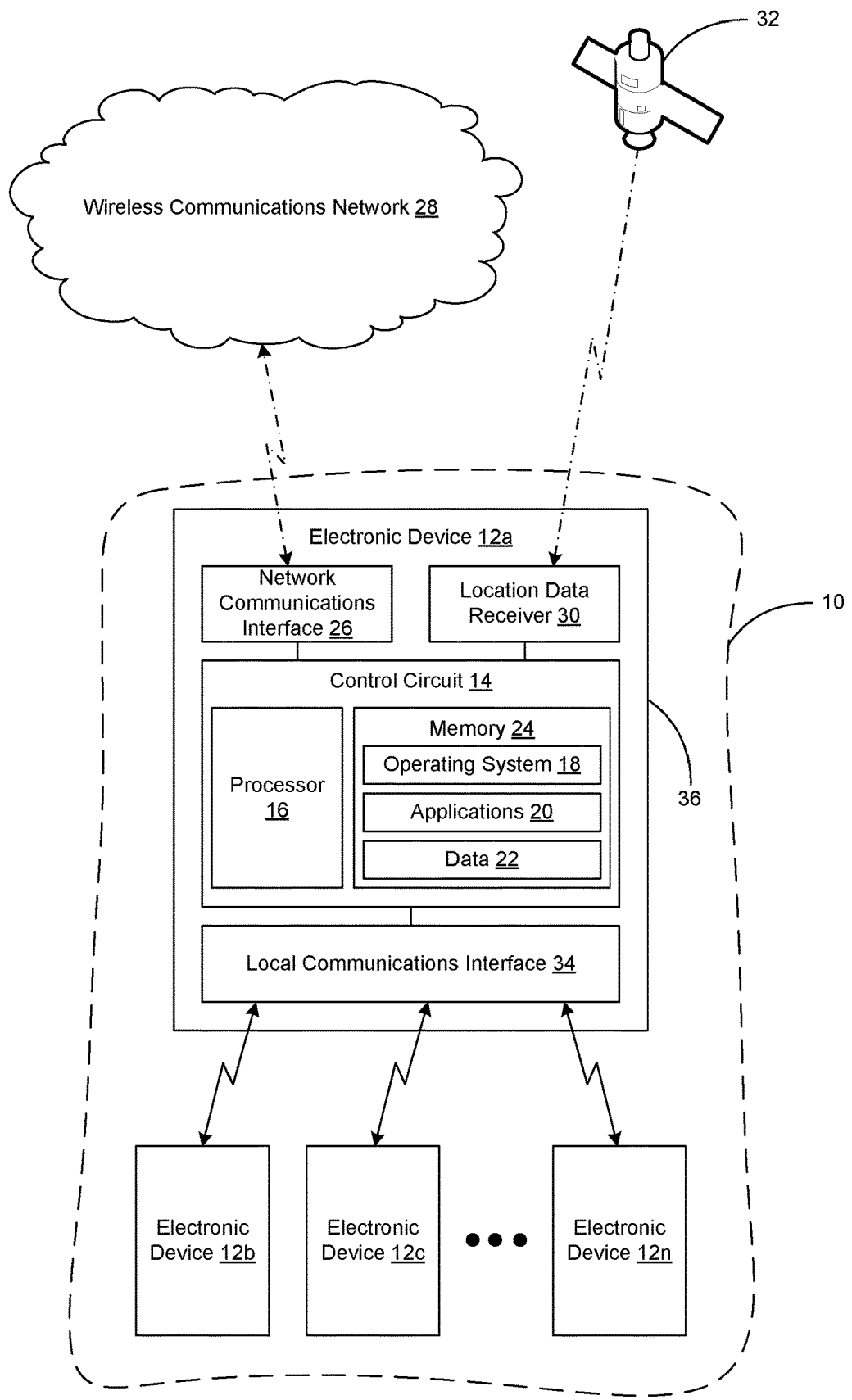
FIG. 1 is a schematic block diagram of an electronic device shown as part of a device cluster.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for sharing cluster head assistance data in a device cluster.

System Architecture

FIG. 1 is a schematic diagram of an exemplary system for implementing the disclosed techniques. It will be appreciated that the illustrated system is representative and other systems may be used to implement the disclosed techniques.

The system includes a cluster 10 of electronic devices 12, which are respectively label as electronic device 12a through electronic device 12n. Each electronic device 12 may be, but is not limited to, a mobile radiotelephone (e.g., a "smartphone"), a user equipment or UE as contemplated under 3GPP standards, a tablet computing device, a computer, a device that uses machine-type communications, machine-to-machine (M2M) communications or device-to-device (D2D) communication (e.g., a sensor, a machine controller, an appliance, etc.), a camera, a media player, a gaming device or console, or an electrical apparatus that is made part of another device (e.g., an appliance, a robot, an industrial machine, etc.). For purposes of description, electronic device 12a is illustrated in greater detail than the other electronic devices 12b through 12n, but it will be understood that each of the electronic devices 12 may have components and functionality to carry out the techniques disclosed herein.

In the illustrated arrangement, electronic device 12a is configured as a cluster head device. The electronic device 12 that carries out cluster head functions may change over time and any one of the other electronic device 12b through 12n may become the cluster head device. In another embodiment, one or more of the electronic devices 12b through 12n may not have components and/or functionality to serve as a cluster head device and will be considered a member of the device cluster 10 but without head device capability.

Referring to the illustrated exemplary electronic device 12a as being representative of the electronic devices 12, generally, the electronic device 12 includes a control circuit 14 that is responsible for overall operation of the electronic device 12. The control circuit 14 includes a processor 16 that executes code, such as an operating system 18 and various applications 20, to carry out various functions of the electronic device 12. Logical functions and/or hardware of the electronic device 12 may be implemented in other manners depending on the nature and configuration of the electronic device 12. Therefore, the illustrated and described approaches are just examples and other approaches may be used including, but not limited to, the control circuit 14 being implemented as hardware (e.g., a microprocessor, microcontroller, central processing unit (CPU), etc.) and executable software or implemented as a combination of hardware and logic (e.g., a system-on-chip (SoC), an application-specific integrated circuit (ASIC), field programmable gate array (FPGA), etc.).

The operating system 18, the applications 20, and stored data 22 are stored on a memory 24. The stored data 22 may include, but is not limited to, data associated with the operating system 18, data associated with the applications 20, and cluster head assistance data as will be described in greater detail.

The memory 24 may be, for example, one or more of a buffer, an electronic memory (e.g., a flash device), a magnetic memory, an optical memory, a removable media, a volatile memory, a non-volatile memory, a random access memory (RAM), or other suitable device. In a typical arrangement, the memory 24 includes a non-volatile (persistent) memory for long term data storage and a volatile memory that functions as system memory for the control circuit 14. The memory 24 is considered a non-transitory computer readable medium. The memory 24, or portions thereof (e.g., a removable memory), need not form a direct part of the control circuit 14.

In one embodiment, the electronic device 12 includes a network communications interface 26 (e.g., communications circuitry) that enables the electronic device 12 to establish an operative wireless communication connection with a wireless communications network 28. In one embodiment, the network communications interface 26 is a cellular modem and the wireless communications network 28 is a cellular radio network that operates under 3GPP standards or similar standards for wireless communications. In the exemplary embodiment, the communications circuitry 26 includes a radio circuit. The radio circuit includes one or more radio frequency transceivers and at least one antenna assembly. Wired communications interfaces also may be present. The communications interface 26 is operational to conduct communications with other devices (e.g., one or more servers) over the wireless communications network 28. Access to Internet locations may be made via the communications interface 26 and wireless communications network 28 and/or through another operative interface, such as a local area network (e.g., WiFi network).

The electronic device 12 may include a variety of other components. For instance, a location data receiver 30 may be present to assist in determining the location of the electronic device 12. The location data receiver 30 may be a global navigation satellite system (GNSS) receiver, examples of which include a global position system (GPS) receiver, a GLONASS receiver, a Galileo System receiver, and a BeiDou Navigation Satellite System (BDS) receiver. In the illustrated embodiment, the location data receiver 30 receives signals from one or more satellites 32.

The electronic device 12 may include a local communications interface 34 over which communications with the other electronic devices 12 in the cluster 10 are made. The local communications interface 34 may be, for example, a Bluetooth interface, a Bluetooth Mesh interface, an interface based on IEEE 802.15.4 (e.g., Zigbee, ISA100.11a, WirelessHART, MiWi, SNAP or Thread). Other types of interfaces for the local communications interface 34 are possible. The local communications interface 34 may have a limited operational range, such as about 100 meters or less, 50 meters or less, or 30 meters or less. As such, the geographic area of the cluster 10 is commensurately limited by the operative range of the local communications interface 34.

The electronic device 12 may include a display (not shown) for displaying visual information to a user. The display may be coupled to the control circuit 14 by a video circuit that converts video data to a video signal used to drive the display. The video circuit may include any appropriate buffers, decoders, video data processors, and so forth.

The electronic device 12 may include one or more user inputs (not shown) for receiving user input for controlling operation of the electronic device 12. Exemplary user inputs include, but are not limited to, a touch sensitive input that overlays or is part of the display for touch screen functionality, a keypad, and one or more buttons. Other types of data inputs may be present, such as one or more motion sensors (e.g., gyro sensor(s), accelerometer(s), etc.).

The electronic device 12 may further include a sound circuit (not shown) for processing audio signals. Coupled to the sound circuit are a speaker and a microphone that enable audio operations to be carried out with the electronic device 12 (e.g., conduct telephone calls, output sound, capture audio, etc.). The sound circuit may include any appropriate buffers, encoders, decoders, amplifiers, and so forth.

The electronic device 12 may further include a power supply unit (not shown) that includes a rechargeable battery. The power supply unit supplies operational power from the battery to the various components of the electronic device in the absence of a connection from the electronic device 10 to an external power source.

The electronic device 12 may include one or more input/output (I/O) connectors (not shown) in the form electrical connectors for operatively connecting to another device (e.g., a computer) or an accessory via a cable, or for receiving power from an external power supply.

The electronic device 12 also may include a subscriber identity module (SIM) card slot (not shown) in which a SIM card (not shown) is received, may have an embedded SIM (e.g., an embedded universal integrated circuit card or eUICC), or may have an integrated SIM (e.g., an integrated universal integrated circuit card or iUICC).

The electronic device 12 also may include a camera (not shown) for capturing still images and/or video.

Depending on the purpose and configuration of the electronic device 12, other components may be present such as, but not limited to, sensors and actuators.

The electronic devices 12 may communicate with one another over their respective local communications interfaces 34. One of the electronic devices 12 (e.g., electronic device 12a in the illustrated embodiment) may be designated as a cluster head 36 to carry out communications with the wireless communications network 28 on behalf of all the electronic devices 12 in the cluster 10. For example, referring to the illustrated configuration, communications between a server (not illustrated) accessible via the wireless communications network 28 and any one of the non-head electronic devices 12b through 12n are carried out by way of the head electronic device 12a.

Over time, the cluster head 36 may change from one of the electronic devices 12 to another of the electronic devices 12 (e.g., change from the electronic device 12a to any one of the electronic devices 12b through 12n in the illustrated embodiment). The cluster head 36 may change for one of a number of reasons, such as an electronic device 12 leaving and/or entering the cluster 10, or the amount of charge stored by the battery of a current cluster head device 36 becomes depleted relative to the amount of charge stored by the batteries of other electronic devices 12 in the cluster 10. The reasons that the cluster head 36 may change and the protocol by which the cluster head 36 changes will not be described in greater detail.

Cluster Head Assistance Data Handling within the Cluster

Figure 2:
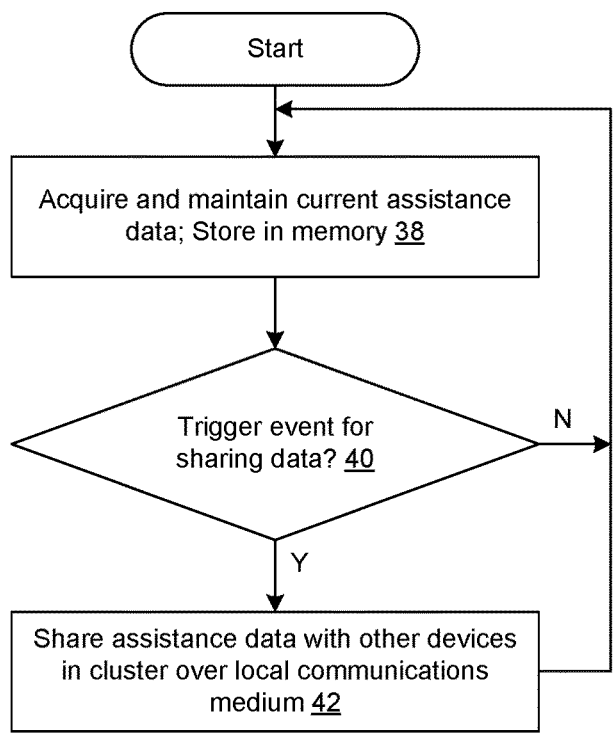
FIG. 2 is a flow diagram of steps taken by a cluster head to share cluster head assistance data in a device cluster.

With additional reference to FIG. 2, shown is an exemplary flow diagram representing steps that may be carried out by the cluster head 36 to collect and share cluster head assistance data. FIG. 2 illustrates an exemplary process flow and, although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 38. In block 38, the electronic device serving as the cluster head 36 for the cluster 10 carries out cluster head operations such as communicating with the other electronic devices 12 by way of the local communications interface 34, communicating with the wireless communications network 28 by way of the network communications interface 26 (including relaying data to and from the non-head electronic devices 10), and receiving location data by way of the location data receiver 30 and determining a location from the received location data. During the course of operating as the cluster head 36, the cluster head 36 acquires various data items that facilities these operations. These data items are stored in the memory 24.

A class of the acquired data items are data items that, if known to another device 12 in the cluster 10 starting up as the cluster head 36 by powering on its network communication interface 26, would accomplish at least one of shorten the time needed to start communications with the wireless communications network 28 or reduce power consumption during the process of becoming the cluster head 36. This class of data items also may include data items that, if known to another device 12 in the cluster 10 starting up as the cluster head 36 by powering on its location data receiver 30, would accomplish at least one of shorten the time needed to make a location determination or reduce power consumption during the process of becoming the cluster head 36.

Examples of acquired data items of this nature include, but are not limited to, a country code for the country in which the cluster 10 and wireless communications network 28 are located, network identity information of the wireless communications network 28, identity information of a network node (e.g., a base station) of the wireless communications network 28 with which the head device 12a communicates, data received from the satellite 32 via the location data receiver 30, and A-GPS data received from an assistance server (not illustrated) accessed via the wireless communications network 28. These items of data are acquired from a source outside the cluster 10 and over one of the network communication interface 26 of the cluster head 36 by interaction with the network medium 28 or from one or more satellites 32 over the location data receiver 30 of the cluster head 36. Also, these items of data are directly related to the operation of the cluster head 36 in its role as the cluster head 36 to provide services to the other electronic devices 12 in the cluster 10. These operations and services include serving as a communication interface to the wireless communications network 28 and providing a location for use in geolocation functions. Since the network communication interface 26 and location data receiver 30 of the non-head electronic devices 12 in the cluster 10 are not powered on, the non-head electronic devices 12 do not have direct access to these data items from the wireless communications network 28 or satellite(s) 32.

As will be described, one or more of these items of data are shared downstream with other electronic devices 12 in the cluster 10. The shared items of data are stored by the other electronic devices 12 and are used by one of the electronic devices 12 to which the cluster head 36 responsibilities switches. In this manner, the new cluster head 36 may expedite taking over as cluster head 36 and/or reduce power consumption during operations to take over as cluster head 36. As such, the shared data items will be referred to as cluster head assistance data.

It will be appreciated that the cluster head assistance data is not application data used by applications of the non-head electronic devices 12 to carry out functions that may occur during routine operation of the non-head electronic devices 12 as part of the cluster 10. Rather, the cluster head assistance data pertains directly to operation of the network communications interface 26 (e.g., cellular modem) or geolocation determination operation that executes in conjunction with GPS or other location data received via the location data receiver 30.

During the course of operating as the cluster head 36, the data items making up the cluster head assistance data may change or may be updated. Therefore, as part of block 38, the cluster head 36 maintains the most current version of the cluster head assistance data in memory 24.

In block 40, the cluster head 36 makes a determination as to whether a triggering event has occurred that prompts the sharing of the cluster head assistance data with the other electronic devices 12 in the cluster 10. An exemplary trigger event is the elapsing of a predetermined amount of time since the cluster head assistance data was shared. Another exemplary trigger event is a change in a predetermined one of the data items making up the cluster head assistance data. If a negative determination is made in block 40, the logical flow may return to block 38.

Upon a positive determination in block 40, the logical flow may proceed to block 42. In block 42, the cluster head 36 shares the cluster head assistance data with the other electronic devices 12 in the cluster 10. Sharing the cluster head assistance data may be accomplished by transmitting the cluster head assistance data to the electronic devices 12 over the operative communications connections between the cluster head 36 and other electronic devices 12 via the respective local communications interfaces 34. When a non-head electronic device 12 receives cluster head assistance data from the cluster head 36, the electronic device 12 stores the cluster head assistance data in memory 24. Also, the electronic devices 12 periodically share respective battery status information. The sharing of battery status information may be prompted by the sharing of cluster head assistance data.

Figure 3:
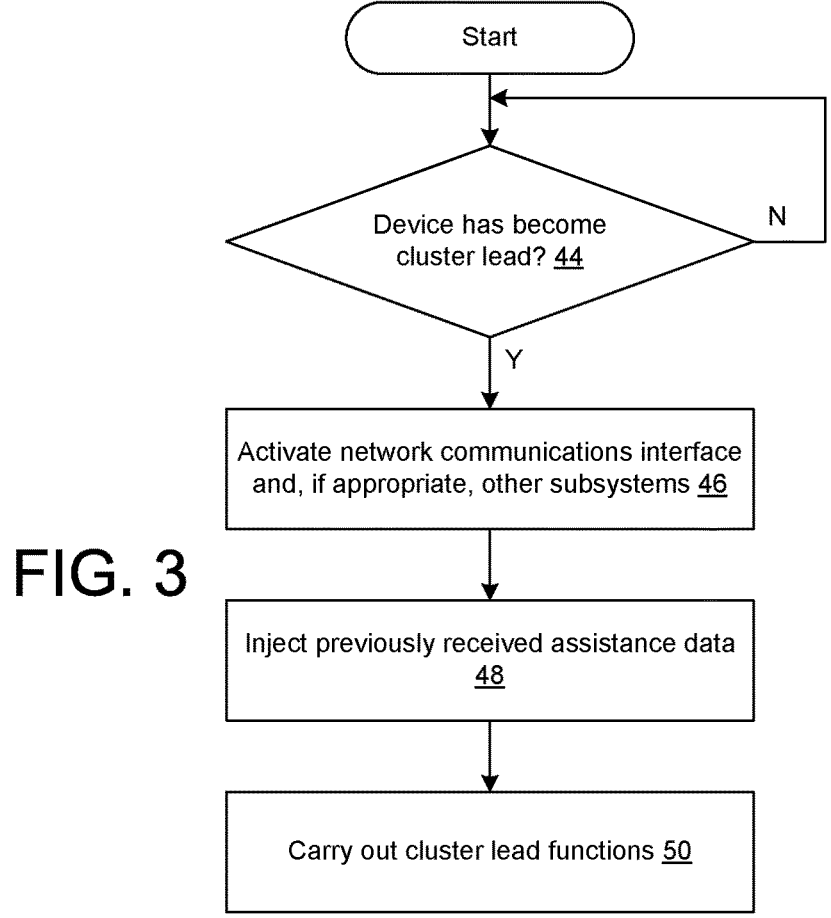
FIG. 3 is a flow diagram of steps taken by a device to become a new cluster head in a device cluster.

With additional reference to FIG. 3, shown is an exemplary flow diagram representing steps that may be carried out by one of the electronic devices 12 to take over cluster head functions from another one of the electronic devices 12. FIG. 3 illustrates an exemplary process flow and, although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 44. In block 44, the electronic device 12 makes a determination as to whether the cluster 10, a network function or a centralized cluster manager has designated the electronic device 12 to become the new cluster head 36 and undertake cluster head functions currently carried out by the current cluster head 36. In most cases, the electronic device 12 does not independently make a determination to become the cluster head 36. If electronic device 12 is not to become the new cluster head 36, then the electronic device 12 may continue to carry out its normal operational functions and interact as appropriate with the current cluster head 36 or other electronic devices 12 in the cluster 10.

Upon a positive determination in block 44, the logical flow may proceed to block 46. In block 46, the electronic device 12 commences preparation to become the cluster head 36. For example, the electronic device 12 may activate (e.g., power on) its network communication interface 26. Other subsystems also may be activated, such as the location data receiver 30.

In block 48, the electronic device 12 injects relevant data items from previously received and stored cluster head assistance data into the functionality of the electronic device 12 that is activated to carry out cluster head operations. As used herein, the term "inject" means to read the relevant data item from memory 24 and enter a value (or values) of the data item into an appropriate process or subsystem (e.g., network communication interface 26 or location data receiver 30) of the electronic device 12. For instance, the country code, network identifier, and/or network node identifier may be entered into an appropriate data field in a process (or processes) used to support operation of the network communication interface 26 during establishing connectivity with the wireless communications network 28. Thus, the process into which each data item related to operation of the network communications interface 26 is injected may be resident in the control circuit 14 or the network communications interface 26, or distributed between the control circuit 14 and the network communications interface 26. A result of the injection is that the electronic device 12 may spend less time and/or consume less energy to establish connectivity with the wireless communications network 28 by conducting less scanning for service and information.

Similarly, the A-GPS data and/or satellite data may be entered into an into an appropriate data field in a process (or processes) used to support operation of the location data receiver 30 during at least the first location determination made by the electronic device 12 as the new cluster head 36. Thus, the process into which each data item related to location determination is injected may be resident in the control circuit 14 or the location data receiver 30, or distributed between the control circuit 14 and the location data receiver 30. A result of the injection is that the electronic device 12 may spend less time and/or consume less energy to make a location determination since processing and/or data collection already made by the prior cluster head 36 may be leveraged during at least the initial location determination made by the new cluster head 36.

In block 50, the electronic device 12 carries out cluster head functions, including establishing operative connection with the wireless communications network 28 and/or determining a geolocation of the electronic device 12. Additional functions include serving as the interface for the non-head electronic devices 12 to the wireless communications network 28, sharing determined geolocation information with the non-head electronic devices 12, and sharing cluster head assistance data as described in connection with FIG. 2.

During the course of operation, if a non-head electronic device 12 fails to receive cluster head assistance data or other communication from the cluster head 36 for a predetermined period of time, then the electronic device 12 may enter a routine to rejoin the cluster 10 or find a new cluster. For instance, the electronic device 12 may first try to scan for the cluster head 36. If the cluster head 36 is still in range and functioning as the cluster head 36, then cluster head assistance data may be shared and typical operation may resume. Otherwise, the electronic device 12 may scan for other devices that were in the cluster 10 to determine if a new cluster head has been appointed. If so, cluster head assistance data may be shared and typical operation may resume. If this approach fails, then the electronic device may attempt to form a new cluster with found devices or join a different existing cluster. In this case, the previously received cluster head assistance data may be used by the electronic device 12 should it be assigned as the cluster head for the new cluster.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of operating an electronic device to serve as a new cluster head for a cluster of electronic devices, comprising:
   receiving cluster head assistance data from a current cluster head device, the cluster head assistance data comprising at least one data item related to establishment of operative communication with a wireless communications network over a network communications interface of the electronic device, and wherein the cluster head assistance data further comprises at least one data item related to geolocation;
   becoming assigned the new cluster head for the cluster; and
   establishing operative communication with the wireless communications network using the cluster head assistance data in a process related to operation of the network communications interface.

2. The method of claim 1, wherein the at least one data item related to geolocation comprises a country code for the country in which the cluster and the wireless communications network are located.

3. The method of claim 1, wherein the at least one data item related to establishment of operative communication with the wireless communications network comprises network identity information of the wireless communications network.

4. The method of claim 1, wherein the at least one data item related to establishment of operative communication with the wireless communications network comprises identity information of a network node of the wireless communications network with which the current cluster head communicates.

5. The method of claim 1, further comprising acquiring new cluster head assistance data and sharing the new cluster head assistance data with the other electronic devices in the cluster.

6. The method of claim 1, further comprising sharing the cluster head assistance data with the other electronic devices in the cluster over a local communications medium.

7. The method of claim 1, wherein upon the electronic device becoming assigned to be the new cluster head for the cluster, and prior to establishing operative communication with the wireless communications network, the electronic device:
   activating functionality to carry out cluster head operations; and
   injecting the cluster head assistance data into the activated functionality.

8. The method of claim 7, wherein the injecting includes reading one or more data items from the cluster head assistance data as stored in memory and entering one or more values corresponding to the one or more read data items into one or more processes or subsystems of the activated functionality.

9. The method of claim 1, wherein the at least one data item related to geolocation comprises at least one of geolocation data from a satellite or assisted global positioning system (A-GPS) data.

10. An electronic device configured to take over as a new cluster head for a cluster of electronic devices from a current cluster head, the electronic device comprising:
    a network communications interface over which the electronic device is configured to communicate with a wireless communications network;
    a local communications interface over which the electronic device is configured to communicate with the electronic devices in the cluster, including receiving cluster head assistance data from the current cluster head, the cluster head assistance data comprising at least one data item related to establishment of operative communication with the wireless communications network, and wherein the cluster head assistance data further comprises at least one data item related to geolocation; and
    a control circuit that, upon the electronic device becoming assigned to be the new cluster head for the cluster, controls the network communications interface to establish operative communication with the wireless communications network using the cluster head assistance data in a process related to the operative communication.

11. The electronic device of claim 10, wherein the at least one data item related to geolocation comprises a country code for the country in which the cluster and the wireless communications network are located.

12. The electronic device of claim 10, wherein the at least one data item related to establishment of operative communication with the wireless communications network comprises network identity information of the wireless communications network.

13. The electronic device of claim 10, wherein the at least one data item related to establishment of operative communication with the wireless communications network comprises identity information of a network node of the wireless communications network with which the current cluster head communicates.

14. The electronic device of claim 10, wherein the electronic device is further configured to acquire new cluster head assistance data and share the new cluster head assistance data with the other electronic devices in the cluster.

15. The electronic device of claim 10, wherein the electronic device is further configured to share the cluster head assistance data with the other electronic devices in the cluster over a local communications interface.

16. The electronic device of claim 10, wherein upon the electronic device becoming assigned to be the new cluster head for the cluster, and prior to establishing operative communication with the wireless communications network, the control circuit:
    activates functionality to carry out cluster head operations; and
    inject the cluster head assistance data into the activated functionality.

17. The electronic device of claim 16, wherein the injecting includes reading one or more data items from the cluster head assistance data as stored in memory and entering one or more values corresponding to the one or more read data items into one or more processes or subsystems of the activated functionality.

18. The electronic device of claim 10, wherein the at least one data item related to geolocation comprises at least one of geolocation data from a satellite or assisted global positioning system (A-GPS) data.

\* \* \* \* \*